United States Patent
Cox

(10) Patent No.: US 7,107,314 B2
(45) Date of Patent: Sep. 12, 2006

(54) MAIL SYSTEM SYNCHRONIZATION USING MULTIPLE MESSAGE IDENTIFIERS

(75) Inventor: Alan Cox, Swansea (GB)

(73) Assignee: Red Hat, Inc., Raleigh, NC (US)

( * ) Notice: Subject to any disclaimer, the term of this patent is extended or adjusted under 35 U.S.C. 154(b) by 133 days.

(21) Appl. No.: 10/348,201

(22) Filed: Jan. 21, 2003

(65) Prior Publication Data

US 2004/0153483 A1 Aug. 5, 2004

(51) Int. Cl.
*G06F 15/16* (2006.01)
*G06F 17/30* (2006.01)

(52) U.S. Cl. ...................... 709/205; 707/201
(58) Field of Classification Search ............. 709/206, 709/245, 230, 217, 205; 707/201, 203
See application file for complete search history.

(56) References Cited

U.S. PATENT DOCUMENTS

| | | | |
|---|---|---|---|
| 5,553,239 A | | 9/1996 | Heath et al. |
| 5,758,354 A | * | 5/1998 | Huang et al. ............... 707/201 |
| 5,828,876 A | | 10/1998 | Fish et al. |
| 5,966,714 A | * | 10/1999 | Huang et al. ............... 707/201 |
| 6,360,272 B1 | * | 3/2002 | Lincke et al. ............... 709/238 |
| 6,393,464 B1 | | 5/2002 | Dieterman |
| 6,633,924 B1 | * | 10/2003 | Wu et al. .................... 719/328 |
| 6,711,609 B1 | * | 3/2004 | Boyer et al. ................ 709/206 |
| 2002/0107950 A1 | | 8/2002 | Lu |
| 2003/0187938 A1 | * | 10/2003 | Mousseau et al. .......... 709/206 |
| 2004/0153483 A1 | | 8/2004 | Cox |

OTHER PUBLICATIONS

Adams, Steve. Oct. 1999, Oracle8i Internal Services: for Waits, Latches, Locks, and Memory. O'Reilly & Associates, Inc. Sebastopool, California.
Shah, Jay. 1991. "VAXclusters and Other High-Availability Systems." *VAXclusters: Architecture, Programming and Mangement.* McGraw-Hill, Inc. p. 57-99.
Kenah, Lawrence J. et al. 1984. "VAX/VMS Lock Manager." *VAX/VMS Internals and Data Structures.* Digital Press. p. 244-263.
International Search Report for International Application No. PCT/US2004/023327 mailed Apr. 21, 2005.

* cited by examiner

*Primary Examiner*—Paul H. Kang
(74) *Attorney, Agent, or Firm*—Wilmer Cutler Pickering Hale and Dorr LLP

(57) ABSTRACT

An electronic mail system includes multiple devices, on each of which a user may have an electronic mailbox. The electronic mailboxes can be synchronized, so that actions taken on one device are reflected on other devices. Each mail message is assigned a unique message identifier. When the message is read or moved from one folder to another folder, it is assigned a new message identifier. The system maintains a list of subsidiary identifiers for each message, which identifies the prior message identifiers for the message. The system identifies message identifiers that have been added since the last synchronization. During synchronization, by examining messages having a current or prior message identifier that is found in the list of subsidiary identifiers for a message having a new message identifier, the system is able to synchronize the mailboxes on the devices. Following synchronization, each synchronized device will have the same messages in the same folders, with the same message identifiers, and duplicates caused by taking the same action on two different devices are removed.

8 Claims, 9 Drawing Sheets

MAIL SYSTEM SYNCHRONIZATION USING MULTIPLE MESSAGE IDENTIFIERS

FIELD OF THE INVENTION

This invention relates to electronic mail systems and, more particularly, to electronic mail systems accessible from multiple devices.

BACKGROUND OF THE INVENTION

Electronic mail has become an important means for communicating in business and other contexts. Users often have multiple devices for accessing electronic mail, including one or more computers and an array of wireless devices. In addition, users may have the ability to access electronic mail from devices they do not own or control. Users want to be able to access their electronic mail from any device.

With many existing electronic mail systems, electronic mail messages are downloaded to the device on which the message is read or information about the message is maintained on the device. Thus, information about a particular message may be located on multiple devices in multiple locations. A particular device may not be on the network or accessible to other devices at any given time.

These existing electronic mail systems do not provide an adequate mechanism for synchronizing the state of a user's electronic mailbox on one device with the state of the user's mailbox on another device.

SUMMARY OF THE INVENTION

The present invention permits electronic mailboxes on multiple devices to be synchronized, so that actions taken on one device are reflected on other devices. In some embodiments, this synchronization can take place across multiple devices at multiple times. Particular devices do not need to connect to all other devices.

The synchronization allows the state of each message to become consistent across multiple devices, without the need for each device to be connected at the same time or to all the other devices, and a device does not need to communicate with other devices during the process of delivering, moving, or deleting a message.

Following synchronization, a message read on one device will appear as read on other devices. Also, a message deleted or moved from one folder to another will appear as moved or deleted on the other devices.

The invention can be used to provide a fault-tolerant mail system, in which unavailable nodes are resynchronized when they become available and only messages unique to a failed node are lost in the event of a system failure. Messages already replicated on another node through the synchronization process can be regenerated.

Each mail message is assigned a unique message identifier. When the message is moved from one folder to another folder, it is assigned a new message identifier. By keeping track of new message identifiers, a list of prior message identifiers, and/or the prior identifiers for a message, actions taken on multiple devices can be synchronized.

DETAILED DESCRIPTION OF THE PREFERRED EMBODIMENTS

Figure 1:
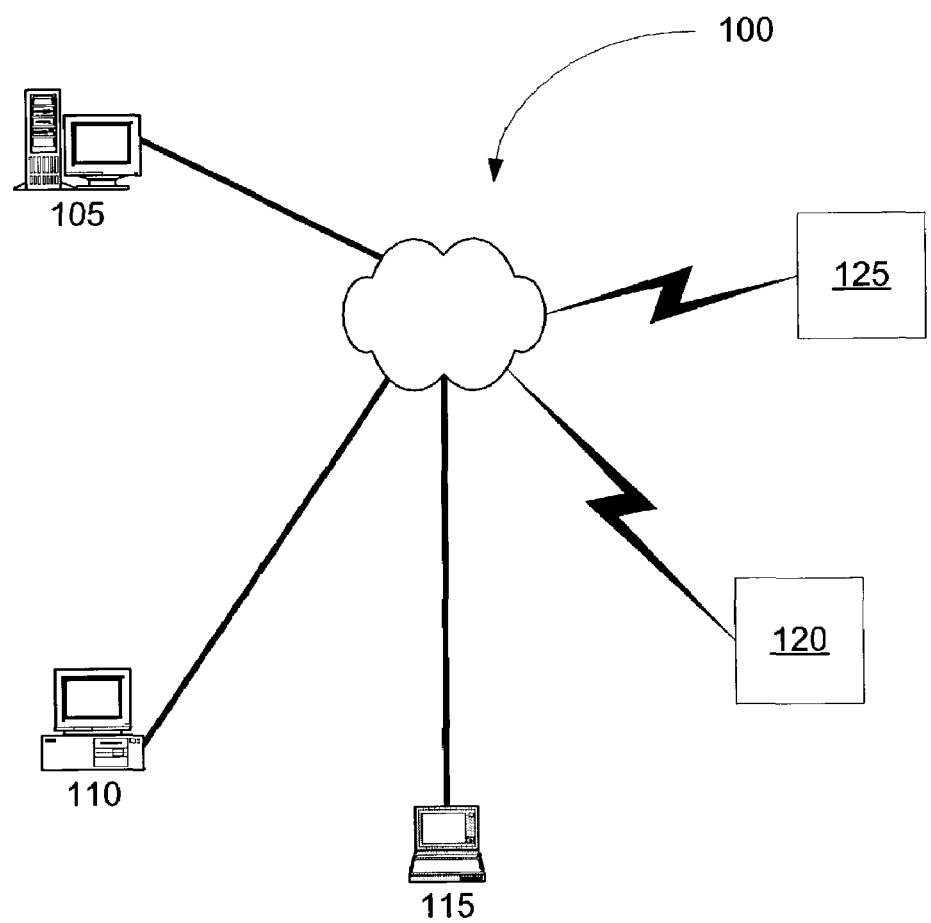
FIG. 1 is a block diagram illustrating an example of a network with multiple devices according to an embodiment of the present invention.

As shown in FIG. 1, network 100, which may be the Internet or some other network, includes multiple devices that can be used to access and process a user's electronic mail. In this example, network 100 includes desktop computers 105 and 110, laptop computer 115, wireless personal digital assistant (PDA) 120, and web-enabled cellular telephone 125. At any point in time, any number of these devices may be connected to the network and/or to any of the devices on the network.

Figure 2A:
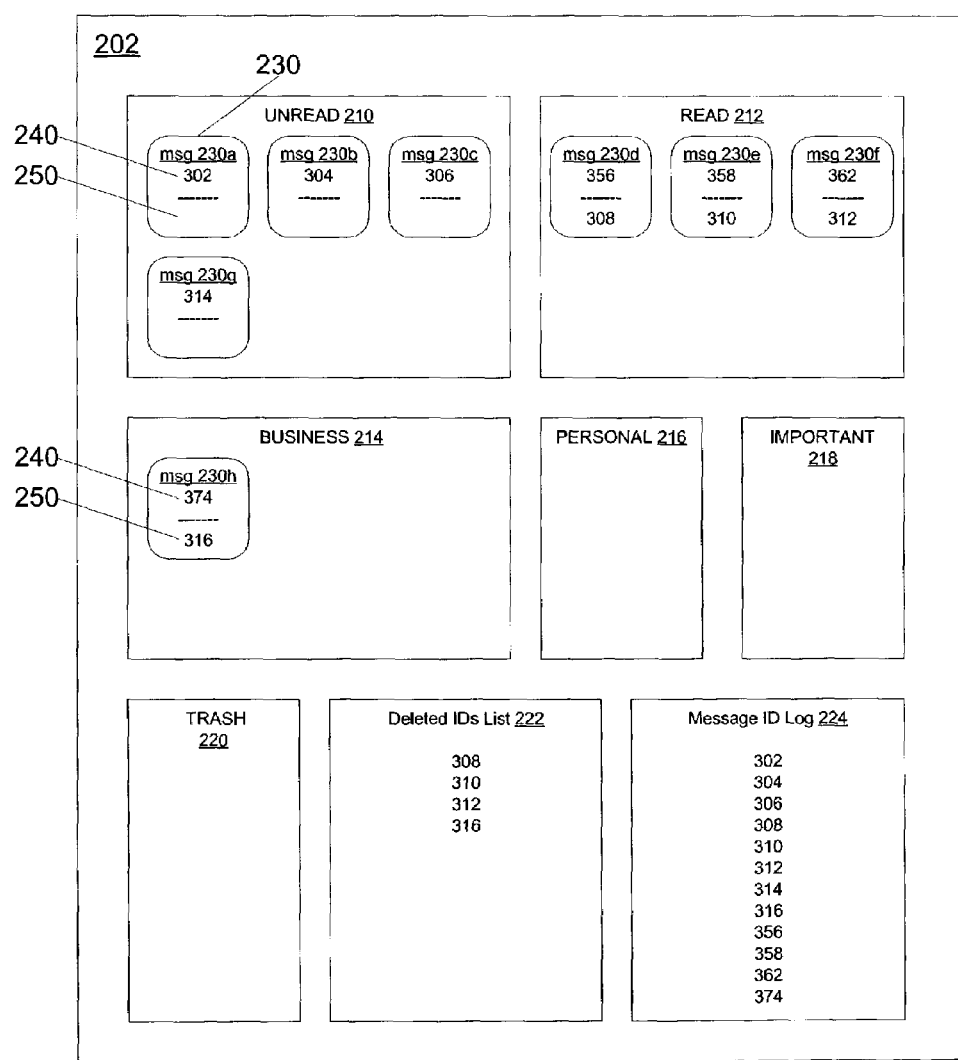
FIGS. 2A–2C are a block diagram illustrating a state of mailbox folders on multiple devices before synchronization according to an embodiment of the present invention.
Figure 2B:
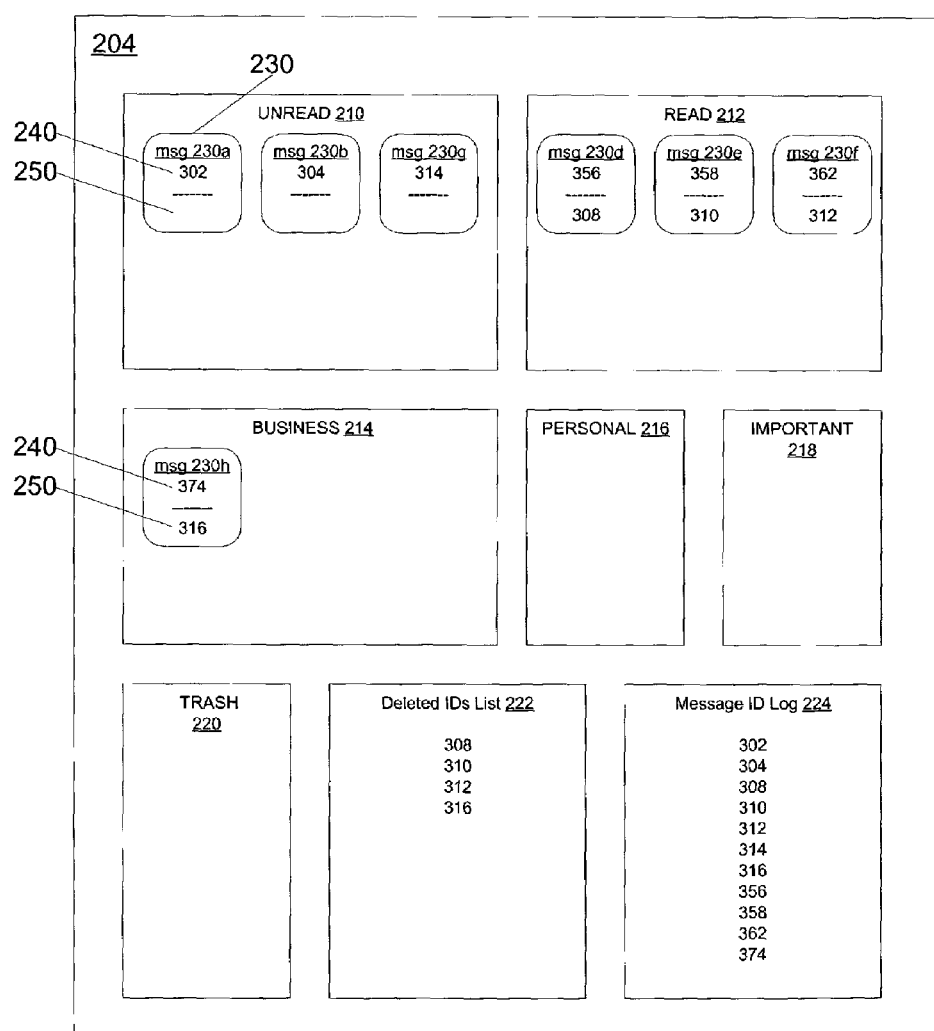
Figure 2C:
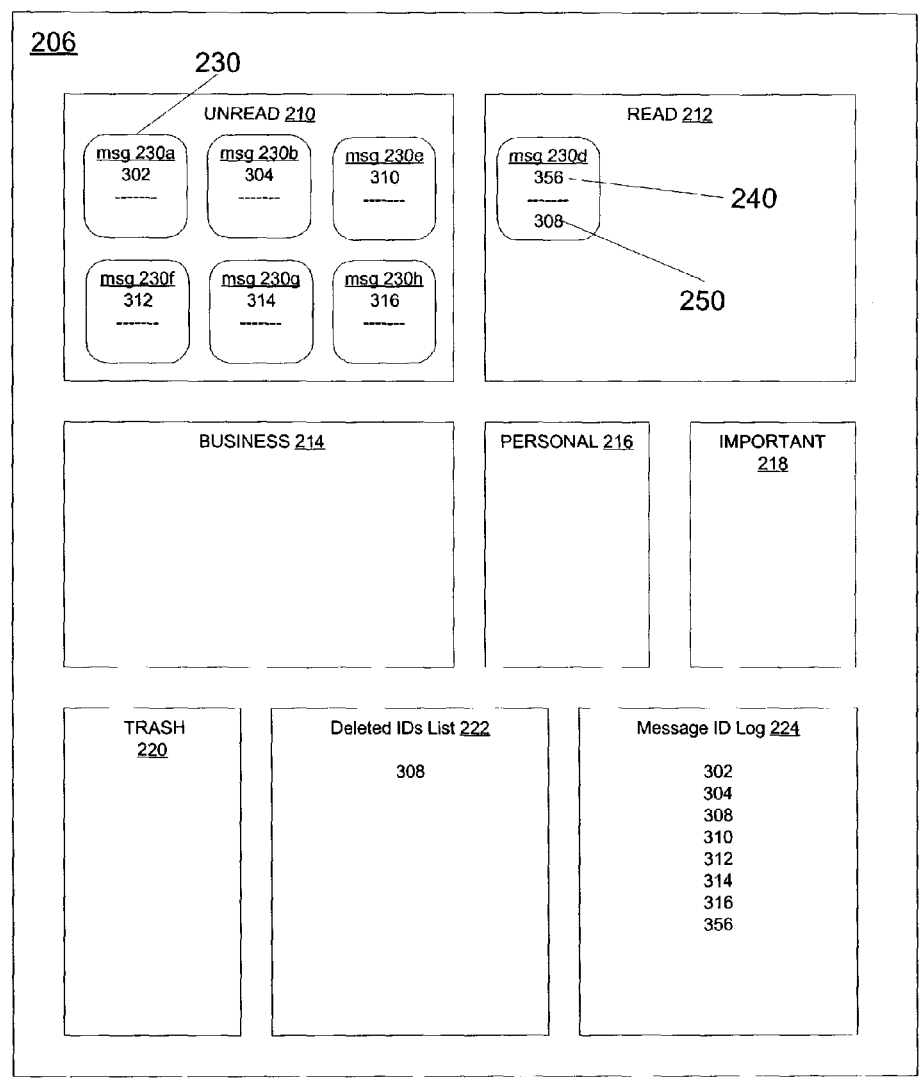
Figure 3A:
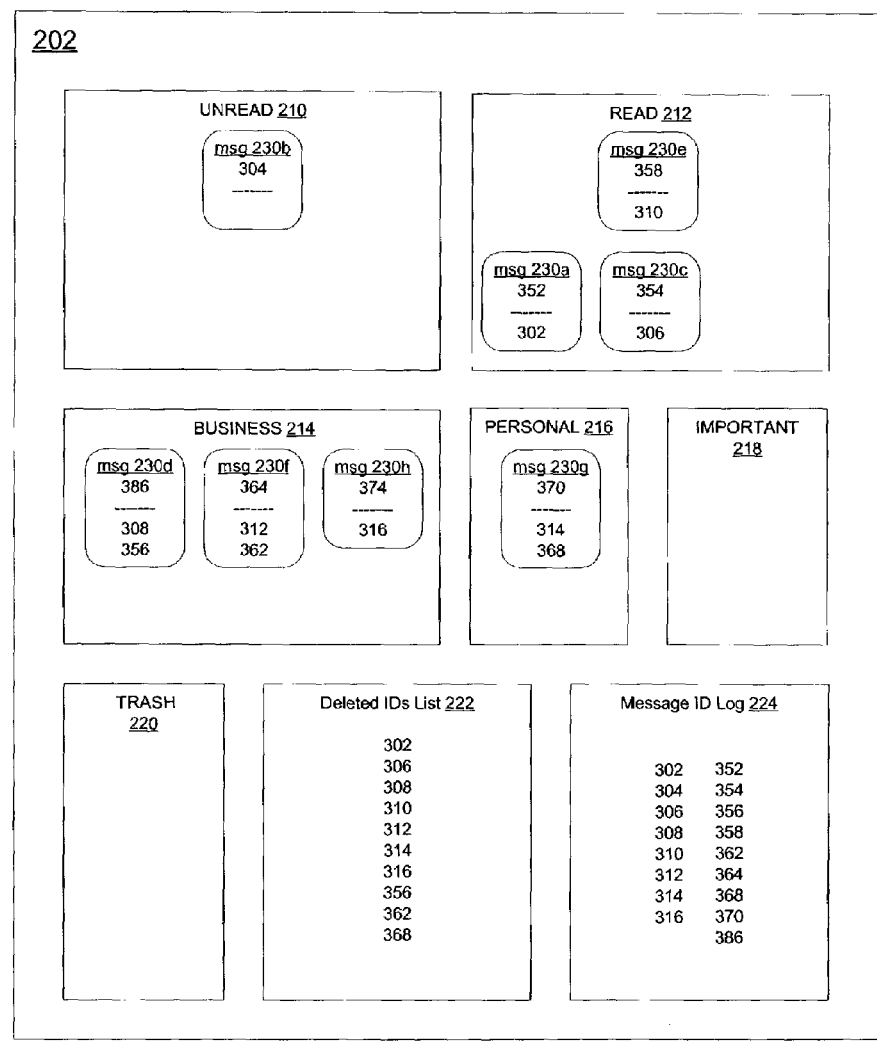
FIGS. 3A–3C are a block diagram illustrating a state of the mailbox folders on multiple devices of FIGS. 2A–2C after some processing of messages on the devices but before synchronization according to an embodiment of the present invention.
Figure 3B:
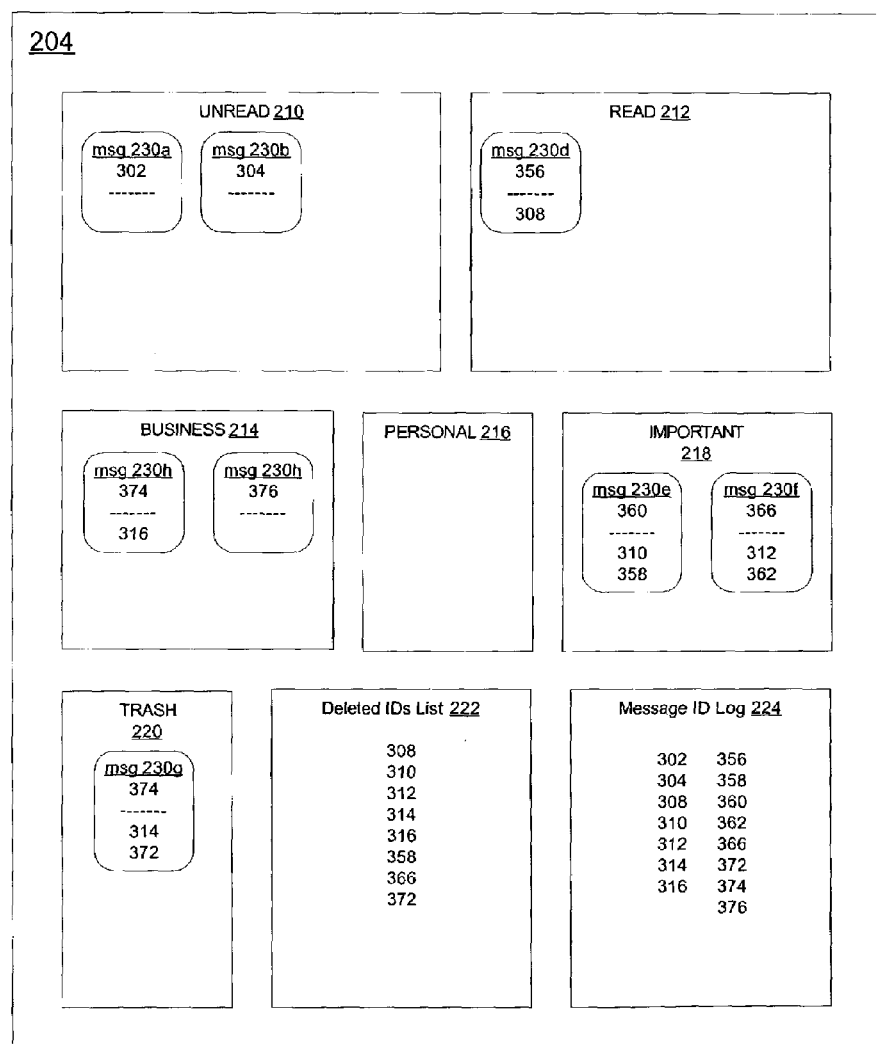
Figure 3C:
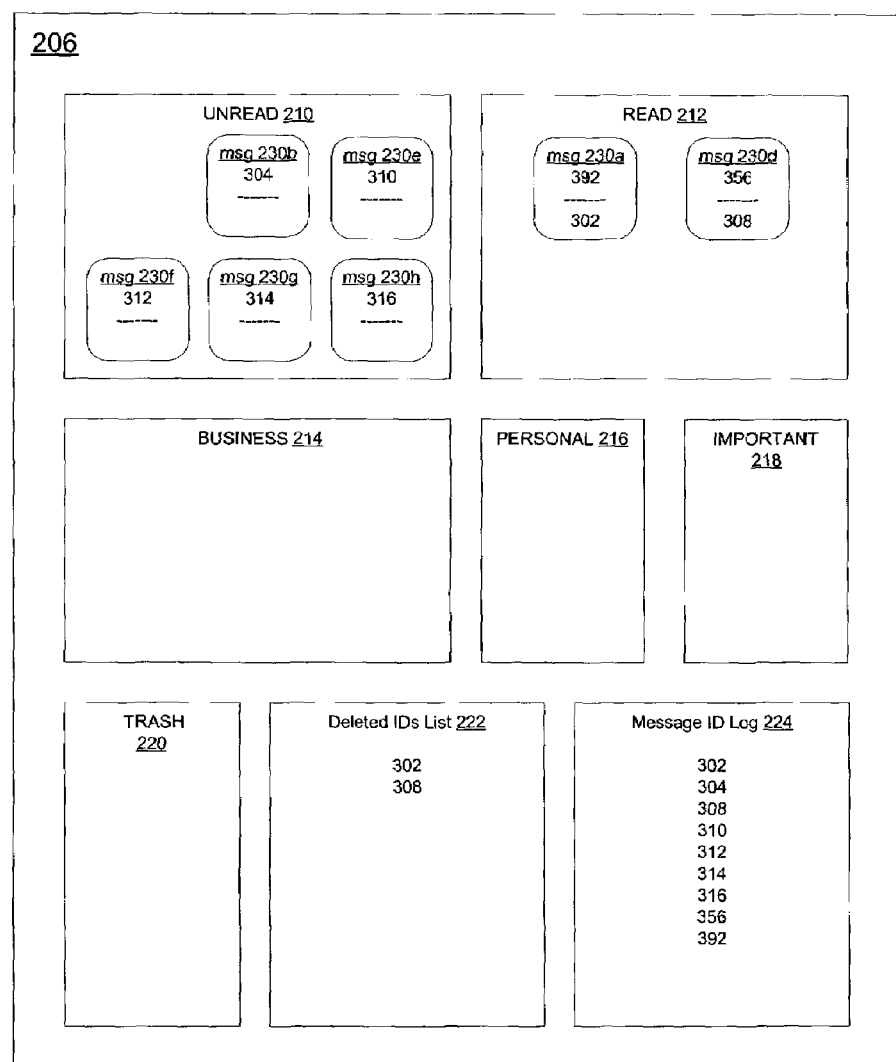
Figure 4:
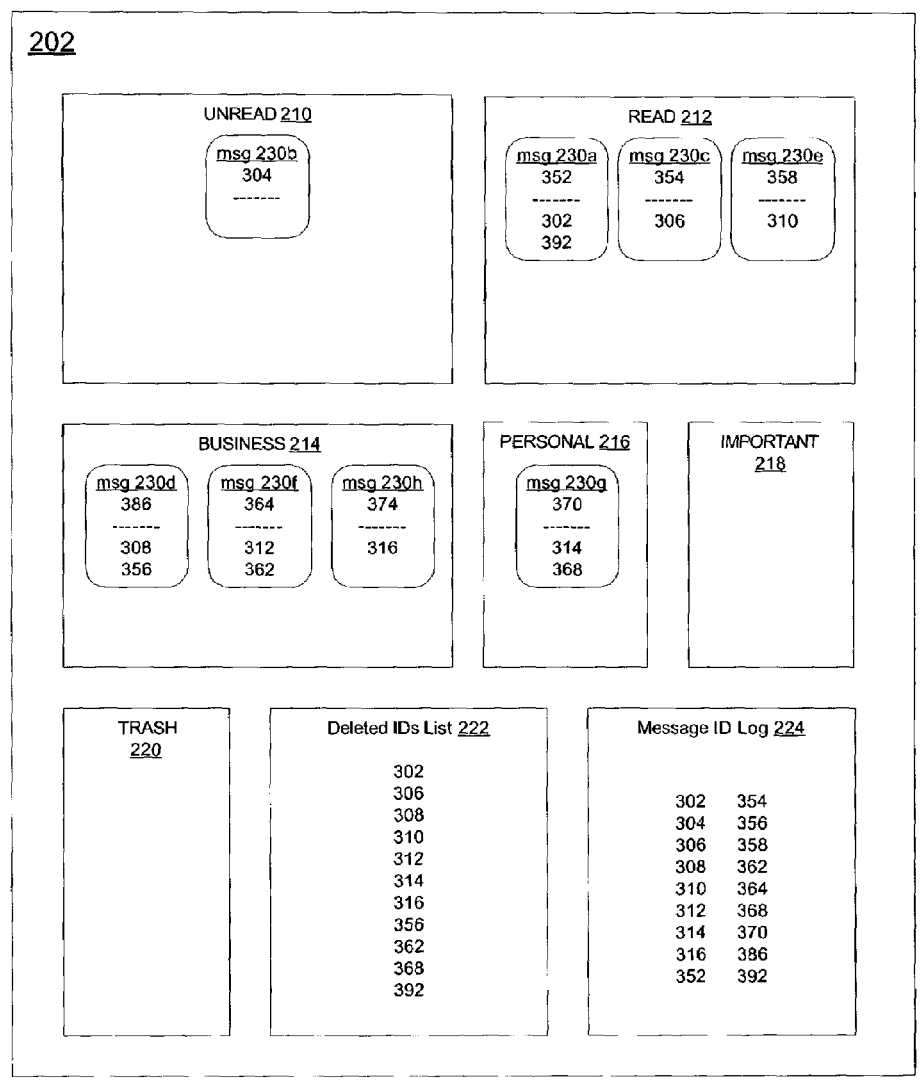
FIG. 4 is a block diagram illustrating a state of the mailbox folders on the devices of FIGS. 3A and 3C after synchronization of these two devices according to an embodiment of the present invention.
Figure 5:
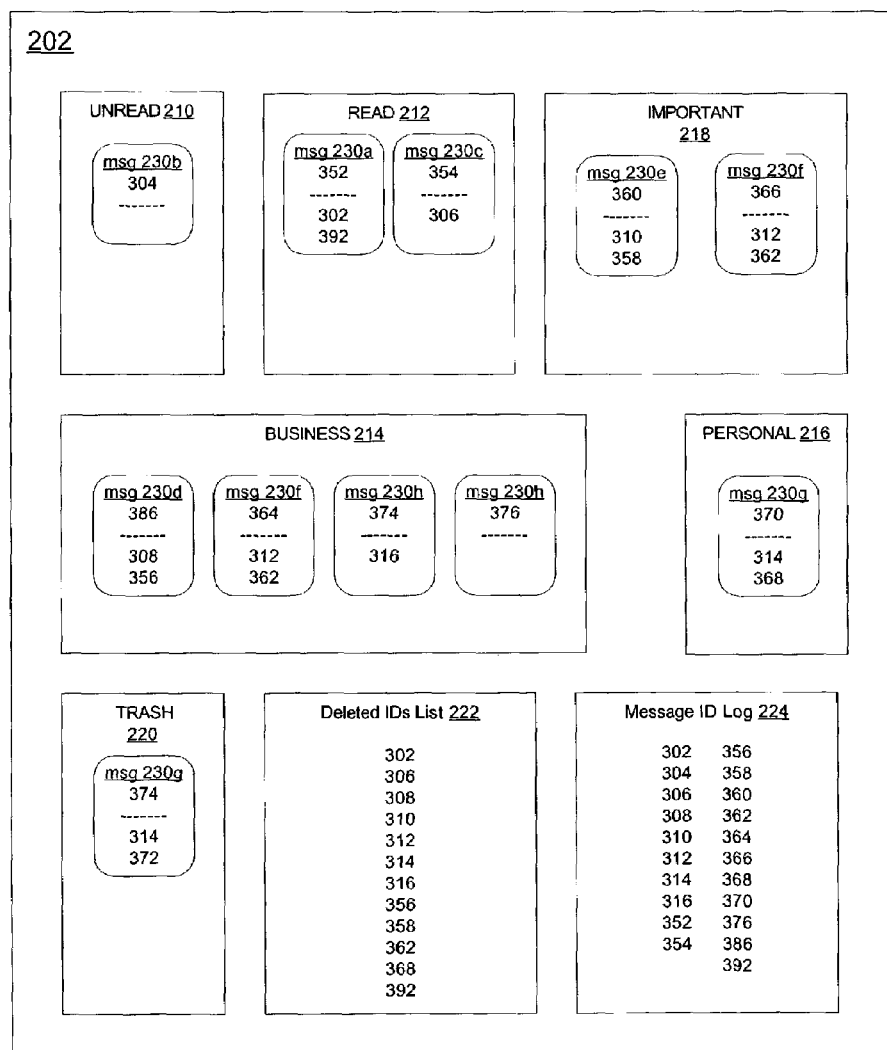
FIGS. 5 is a block diagram illustrating a state of the mailbox folders on the devices of FIGS. 3A–3C after synchronization of those three devices according to an embodiment of the present invention.

FIGS. 2–5 illustrate some messages in each of several folders on devices 202 (shown in FIGS. 2A and 3A), 204 (shown in FIGS. 2B and 3B), and 206 (shown in FIGS. 2C and 3C). FIG. 4 shows how devices 202 and 206 look after those two devices have been synchronized. FIG. 5 shows how each of devices 202, 204, and 206 looks after all three have been synchronized. In general, two or more devices can be synchronized at the same time, depending on which devices are active on a network or otherwise connected with each other at the time of the synchronization. Over time, even by synchronizing only a subset of the devices at a time, the devices will tend toward having the same messages in the same folders.

In this example, the user has an unread mail folder 210, a read mail folder 212, a business folder 214, a personal folder 216, and an important messages folder 218. In addition, messages can be deleted, in which case they are placed in trash folder 220. Although organized as separate "folders," unread messages and read messages could be presented to the user in a single folder, such as an "inbox" folder. However, the system treats unread messages and read messages (which have not been moved to another folder) as existing in separate folders. Similarly, trash folder 220 need not appear as a separate folder to the user, although the system can treat deleted messages as if they exist in a separate folder.

Deleted message identifiers list 222 maintains a list of message identifiers that have been deleted. In some embodiments, message identifiers can be removed from deleted message identifiers list 222 once a synchronization involving that deleted message identifier has occurred on all the devices. Alternatively, deleted message identifiers list 222 can be pruned so that only relatively recent additions to the list are maintained. For example, once a message identifier has been in deleted message identifiers list 222 for two months, it may be removed from the list.

Message identifier log 224 maintains a list of all message identifiers known to the device, both from generating a message identifier and from learning of the message identifier following a synchronization operation. Alternatively, message identifier log 224 can be more restricted. It could, for example, maintain only a list of message identifiers that have not been deleted and/or only a list of message identifiers generated on that device. As with deleted message identifiers list 222, message identifier log 224 also can be limited to relatively current messages.

Each mail message 230 is assigned a message identifier 240. A message identifier 240 may be unique for the electronic mail system as a whole or for a particular user. In some embodiments, the message identifier is unique only for the current universe of messages. Once a message has been removed from the system or is no longer being synchronized, its message identifier can be reused.

In some embodiments, the message identifier 240 is generated using a Universal Unique Identifier (UUID) algorithm, with the message identifier including a timestamp and the IP address of the device at which the message identifier is generated. This ensures that two or more devices will not assign the same message identifier. Alternatively, other algorithms for generating a unique identifier can be used. Although depicted as a single field, the message identifier can be based on a combination of multiple fields or pieces of data.

When a message is moved from one folder to another folder, it is assigned a new message identifier. Its prior message identifier is added to a list of subsidiary identifiers 250. Optionally, the list of subsidiary identifiers for a message can be cleared if, for example, the system is fully synchronized with respect to that message, a sufficient period of time has elapsed since the last change to the message.

FIGS. 2 and 3 illustrate the state of the mailboxes before (FIG. 2) and after (FIG. 3) some activity but before any synchronization. Message 230a has been read (that is, has been moved from unread folder 210 to read folder 212) on devices 202 and 206, but not on device 204. Accordingly, its original message identifier (the value 302, as seen in FIG. 2 on all three devices), has been replaced with the value 352 on device 202 and with the value 392 on device 206 in FIG. 3. The original value 302 appears as a subsidiary identifier 250 for message 230a and appears in deleted message identifiers list 222 on devices 202 and 206. Although 3 digit message values are shown for convenience in the Figures, it should be understood that actual message identifiers typically would be longer and could take any appropriate form.

Message 230b has not been read on any of the devices. Accordingly, it retains its original message identifier (the value 304) on all three devices in FIG. 3.

Message 230c appears only on device 202, where it has been read. Accordingly, its original message identifier (the value 306, in FIG. 2) has been replaced with the value 354 in FIG. 3 and its original value (306) appears as a subsidiary identifier for message 230c and has been added to deleted message identifiers list 222 on device 202.

Message 230d has been moved from the read folder 212 on device 202 to the business folder 214. It remains in the read folder 212 on devices 204 and 206 with its second message identifier (the value 356). On those devices, the original message identifier (the value 308) appears as a subsidiary identifier and in the deleted message identifiers list 222. On device 202, the message identifier value 356 in FIG. 2 has been replaced with the value 386 in FIG. 3 and its prior values (308 and 356) appear as subsidiary identifiers for message 230d and have been added to deleted message identifiers list 222.

Message 230e has been moved from the read folder on device 204 to the important messages folder 218. It remains in the read folder on device 202 and in the unread folder on device 206. This may result, for example, from devices 202 and 204 having synchronized after the message had been read from one of those devices, and without device 206 having synchronized with either device 202 or device 204 since message 230e was read on device 202 or device 204. Accordingly, its original message identifier (the value 310) remains on device 206 in FIGS. 2 and 3. On device 202, the message has a new message identifier (the value 358), and the original message identifier (the value 310) appears as a subsidiary identifier for message 230e and has been added to deleted message identifiers list 222. On device 204, the message has the message identifier value 358 and a subsidiary identifier (the value 310), and the original message identifier (the value 310) has been added to deleted message identifiers list 222 in FIG. 2. In FIG. 3, the message has the message identifier value 360 and has as subsidiary identifiers the values 310 and 358. The value 358 has been added to deleted message identifiers list 222.

Message 230f has been moved from the read folder on device 202 to the business folder 214, and from the read folder on device 204 to the important messages folder 218. It is unread on device 206. As with message 230e, message 230f retains its original message identifier (the value 312) on device 206 in FIGS. 2 and 3. On devices 202 and 204, the message has a new message identifier value (the value 362) in FIG. 2, and the original message identifier value (the value 312) appears as a subsidiary identifier for message 230f and has been added to deleted message identifiers list 222. In FIG. 3, the message has a new message identifier (the value 364), and has the two previous values (the values 312 and 362) as subsidiary identifiers on device 202. The value 362 has been added to the deleted message identifiers list for device 202. On device 204, the message has a different new message identifier (the value 366), has the two previous values (the values 312 and 362) as subsidiary identifiers, and has the values 312 and 362 on the deleted message identifiers list.

Message 230g has been moved from the unread folder on device 202 to the personal folder 216, and has been deleted on device 204 (that is, moved to trash folder 220). Message 230g remains unread on device 206. Accordingly, its original message identifier (the value 314) appears on device 206 in FIGS. 2 and 3, and on devices 202 and 204 in FIG. 2. On device 202, in FIG. 3, the message was read and then moved to the personal folder 216, so it has a message identifier value 370 and subsidiary identifiers of 314 and 368 (the value it received when it was read). The values 314 and 368 also appear on the deleted message identifiers list for device 202 in FIG. 3. On device 204, in FIG. 3, the message was read (and assigned a message identifier value 372) and then moved to trash folder 220, where it received message identifier value 374. Thus, in FIG. 3, message 230g appears with subsidiary identifier values of 314 and 372, and the values 314 and 372 appear on the deleted message identifiers list 222.

Message 230h, in business folder 214 on device 204 has been copied, so that two versions now appear in business folder 214 on device 204 in FIG. 3. Devices 202 and 206 retain just their original versions—in business folder 214 for device 202 and in the unread messages folder for device 206. Accordingly, on device 206, message 230h appears in FIGS. 2 and 3 with message identifier value 316. On device 202, message 230h has the message identifier value 374 in FIGS. 2 and 3, and the prior message identifier value (the value 316) appears as a subsidiary identifier and on deleted message identifiers list 222. On device 204, one copy of message 230h looks like it does on device 202—it has the message identifier value 374 in FIGS. 2 and 3, and the prior message identifier value (the value 316) appears as a subsidiary identifier. The second copy appears only in FIG. 3, with a new message identifier (the value 376) and no subsidiary identifiers. The original message identifier remains in the deleted message identifiers list 222.

In FIG. 4, device 202 is shown after being synchronized with device 206. Device 206 is not shown separately because, after synchronization, it has the same structure.

Message 230a appears once in read folder 212, with a message identifier value 352 and the values 302 and 392 for subsidiary identifiers. The values 302 and 392 also appear in deleted message identifiers list 222. The message identifier value 392, which was created on device 206 (and therefore appeared on its message identifier log 224 before the synchronization, as shown in FIG. 3C), now also appears on the message identifier log 224 of device 202. In this example, the devices selected the lower message identifier value (that is, the value 352, instead of the value 392) as the new message identifier. Of course, other algorithms could be employed to select which of two (or more) duplicate messages in the same folder to delete. If the devices operate independently in determining which duplicate message(s) to delete, they should employ the same algorithm to make that determination. The devices recognized that the messages with message identifier values of 352 and 392 were duplicates (that is, both represented message 230b) because they were in the same folder and had an overlap in subsidiary identifiers (in this case, the value 302).

Message 230b remains in unread folder 210 because it had not been read on either device 202 or device 206. During the synchronization, its message identifier value (the value 304) appeared on both devices so no action was taken.

Message 230c now appears in read folder 212 on both devices. It had not previously been on device 206. During the synchronization, the message identifier value (the value 354) appeared only on device 202, so message 230c was added to device 206, along with its message identifier (the value 354) and subsidiary identifier list (containing the value 306). The value 306 is added to the deleted message identifiers list 222 for device 206, and the values 306 and 354 are added to message identifier log 224 for device 206.

Message 230d now appears in business folder 214 on both devices. On device 206, the deleted message identifiers list 222 and message identifiers log 224 are updated. The prior message identifier value 356 for message 230d on device 202 appears in the deleted identifiers list 222, indicating that message 230d on device 206, which still has the message identifier value 356, should be deleted from the read folder 212.

Message 230e now appears in read folder 212 on both devices, having been treated in an analogous manner to message 230d.

Message 230f now appears in the business folder 214 on both devices. Although its most recent subsidiary identifier (the value 362) had not appeared previously on device 206, its original message identifier (the value 312) had. That value appears in deleted message identifiers list 222, which allows the version in unread folder 210 on device 206 to be synchronized with the version in business folder 214 on device 202. The deleted message identifiers list 222 and the message identifier log 224 are updated so that they are the same on both devices.

Similarly, message 230g now appears in personal folder 216 on both devices, and message 230h now appears in business folder 214 on both devices.

In FIG. 5, device 202 is shown after the synchronization of devices 202, 204, and 206. It would look the same regardless of whether the synchronization took one or more steps, if no activity took place on the devices between the synchronizations.

Message 230a now appears in read folder 212 on the devices; message 230b continues to appear in unread folder 210 on the devices; message 230c appears in read folder 212 on the devices; message 230d appears in business folder 214 on the devices; and message 230e appears in important messages folder 218 on the devices.

Message 230f had been moved separately to two different folders—business folder 214 on device 202 and important messages folder 218 on device 204. Thus, with neither of these messages is the current message identifier in the deleted messages list. In this example, the message now appears in both folders on the devices.

Message 230g has been moved separately to personal folder 216 on device 202 and to the trash folder on device 204. In this example, the trash folder is treated like any other folder, so the message appears in both folders, like message 230f. Alternatively, if it is desired that a trashed message disappear from all other folders (or that messages moved to the trash folder and to another folder not remain in the trash folder), then the devices can check the subsidiary identifiers of messages in the trash folder against the subsidiary identifiers of messages in other folders, and remove the messages in either the trash folder or the other folders. Further variations on this arrangement are possible, with folders other than the trash folder (such as an important messages folder), or so that only messages in certain folders are removed in this manner. For example, a message moved both to a business folder and to an important messages folder could end up in just the important messages folder, while a message moved to the personal messages folder on one device, and to the business messages folder on another device, could appear in both folders. Also, a message moved from the unread folder to the read folder on one device, and from the unread folder to the read folder and then to another folder on a second device, might appear just in the other folder (that is, not in the read folder) after synchronization.

Message 230h now appears twice in business folder 214. Once, in its original form (with message identifier value 374) and once in its copied form (with message identifier value 376). Because the copied message (with message identifier value 376) does not have the previous values in its subsidiary identifier list, it is treated as a different message.

Deleted message identifiers list 222 can take various forms and can include a variety of information. In addition to the list of message identifiers, deleted message identifiers list 222 can include, for example, information about the messages corresponding to those message identifiers. In some embodiments, deleted message identifiers list 222 includes information about the folder in which the message existed when its message identifier changed, or information about each folder in which the message existed. Similarly, the subsidiary identifier list for a message could include information about the folder in which the message existed when its message identifier changed, or information about each folder in which the message existed. The folder information could be obtained using, for example, an additional field or by assigning message identifiers so that they also identify the folder.

Optionally, by also tracking or identifying the previous folders in which a message appeared, messages moved to two (or more) different folders could be identified and one or more of the duplicates could then be deleted.

Over time, the deleted message identifiers list 222 and/or message identifier log 224 can become long in some embodiments. With some embodiments and with periodic synchronizations, the majority of the data will be the same on each node. Under these circumstances, known algorithms may be employed to provide efficient synchronization of the data sets, such as described in Andrew Tridgell, "Efficient Algorithms for Sorting and Synchronization" (Ph.D thesis, Australian National University, 2000), which is incorporated by reference. The Tridgell thesis may be found at http://samba.anu.edu.au/~tridge/phd_thesis.pdf.

The present invention may be implemented in a variety of forms, such as in software or firmware, running on a general purpose computer or a specialized device. The code can be provided in any machine-readable medium, including magnetic or optical disk, or in memory.

While there have been shown and described examples of the present invention, it will be readily apparent to those skilled in the art that various changes and modifications may be made without departing from the scope of the invention as defined by the following claims. For example, deleted message identifiers list 222 could be omitted, with deleted message identifiers identified by determining which message identifiers are new since the previous synchronization. During the synchronization process, messages could be deleted if their current message identifier is found in the subsidiary identifier list for a message with a new message identifier. Accordingly, the invention is limited only by the following claims and equivalents thereto.

What is claimed is:

1. A method for synchronizing a plurality of electronic mail messages in a plurality of folders on a plurality of devices, wherein a current message identifier is associated with each electronic mail message, the method comprising:

determining which current message identifiers are new for the devices being synchronized since the previous synchronization;

identifying which message identifiers represent messages that should be deleted from particular folders;

removing from each device being synchronized each message having a current message identifier that represents a message that should be deleted;

for each remaining new current message identifier,
    identifying a folder in which a message associated with the new message identifier is located;
    adding to the identified folder on each device being synchronized on which the new message identifier is not found, a new message corresponding to the message associated with the new message identifier; and
    associating with the new message the new message identifier and a list of subsidiary identifiers, wherein a subsidiary identifier is a message identifier that had been replaced by a new current message identifier.

2. The method of claim 1, wherein identifying which message identifiers represent messages that should be deleted includes identifying which new current message identifiers in the same folder on different devices are associated with the same message.

3. The method of claim 2, wherein identifying which new current message identifiers in the same folder on different devices are associated with the same message includes identifying which new current message identifiers in the same folder on different devices are associated with messages having lists of subsidiary identifiers with at least one overlapping message identifier.

4. The method of claim 2, wherein identifying which message identifiers represent messages that should be deleted further includes selecting all but one of the new current message identifiers in the same folder on different devices associated with the same message to be message identifiers that represent messages that should be deleted.

5. The method of claim 2, wherein identifying which message identifiers represent messages that should be deleted further includes identifying message identifiers that have been added to a deleted message identifiers list.

6. The method of claim 2, wherein identifying which message identifiers represent messages that should be deleted further includes determining which current message identifiers appear in a list of subsidiary identifiers for a message having a new current message identifier.

7. The method of claim 1, wherein identifying which message identifiers represent messages that should be deleted includes identifying message identifiers that have been added to a deleted message identifiers list.

8. The method of claim 1, wherein identifying which message identifiers represent messages that should be deleted includes determining which current message identifiers appear in a list of subsidiary identifiers for a message having a new current message identifier.

* * * * *